United States Patent
Gupta et al.

(10) Patent No.: US 12,169,165 B2
(45) Date of Patent: Dec. 17, 2024

(54) ANTIGEN PROTECTION METHOD FOR ENABLING DELAYED SAMPLE PROCESSING

(71) Applicants: Diagnostic BioSystems, Pleasanto, CA (US); Marc Key, Ojai, CA (US)

(72) Inventors: Bipin Gupta, Pleasanton, CA (US); Marc Key, Ojai, CA (US)

(73) Assignees: Diagnostic BioSystems, Pleasanton, CA (US); Marc Key, Ojai, CA (US)

( * ) Notice: Subject to any disclaimer, the term of this patent is extended or adjusted under 35 U.S.C. 154(b) by 984 days.

(21) Appl. No.: 16/787,595

(22) Filed: Feb. 11, 2020

(65) Prior Publication Data
US 2021/0102871 A1 Apr. 8, 2021

Related U.S. Application Data

(60) Provisional application No. 62/909,345, filed on Oct. 2, 2019.

(51) Int. Cl.
| | |
|---|---|
| *G01N 1/28* | (2006.01) |
| *G01N 1/30* | (2006.01) |
| *G01N 1/36* | (2006.01) |
| *G01N 1/44* | (2006.01) |

(52) U.S. Cl.
CPC ............. *G01N 1/28* (2013.01); *G01N 1/2806* (2013.01); *G01N 1/30* (2013.01); *G01N 1/36* (2013.01); *G01N 1/44* (2013.01)

(58) Field of Classification Search
CPC .......... G01N 1/28; G01N 1/2806; G01N 1/30; G01N 1/36; G01N 1/44
See application file for complete search history.

(56) References Cited

U.S. PATENT DOCUMENTS

2017/0122850 A1* 5/2017 Key .................. G01N 1/34

OTHER PUBLICATIONS

Grillo, F et al. Factors affecting immunoreactivity in long-term storage of formalin-fixed paraffin-embedded tissue sections. Histochem. Cell Biol. 2015. 144: 93-99. (Year: 2015).*
Pinheiro, C et al. Optimization of immunocytochemistry in cytology: comparison of two protocols for fixation and preservation on cytospin and smear preparations. Cytopathology. 2015. 26: 38-43. (Year: 2015).*

* cited by examiner

*Primary Examiner* — David W Berke-Schlessel
*Assistant Examiner* — Susan E. Fernandez
(74) *Attorney, Agent, or Firm* — PATENTFILE, LLC; Bradley C. Fach; Steven R. Kick (57) ABSTRACT

An antigen protection method for enabling delayed sample processing may include: fixing a sample; embedding the sample; sectioning the sample and placing a section of the sample in contact with a microscope slide to produce a sectioned sample; de-embedding the sectioned sample; optionally rehydrating the sectioned sample; performing target retrieval on the sectioned sample; and optionally performing target visualization on the sectioned sample. The method may further include the steps of: applying a protecting reagent onto the sectioned sample; drying the protecting reagent; and waiting a period of time, such as greater than six hours, and these steps may be performed after the de-embedding step, rehydrating step, and/or target retrieval step.

7 Claims, 3 Drawing Sheets

ANTIGEN PROTECTION METHOD FOR ENABLING DELAYED SAMPLE PROCESSING

CROSS REFERENCE TO RELATED APPLICATIONS

This application claims priority to and the benefit of the filing date of U.S. Provisional Application No. 62/909,345, filed on Oct. 2, 2019, entitled "Antigen Protection in Paraffin-Embedded Tissue Sections", which is hereby incorporated by reference in its entirety.

FIELD OF THE INVENTION

This patent specification relates to the field of antigen protection for biological samples. More specifically, this patent specification relates to a method of protecting antigens in tissue sections prior to immunohistochemical staining and other analysis procedures.

BACKGROUND

Antigen degradation and the accompanying loss of the ability of a tissue section mounted on a microscope slide to stain by antibody methods is a common problem encountered in immunohistochemistry. Once the tissue section has been deparaffinized staining must commence promptly in order to avoid this problem. After deparaffinization the tissue must be kept wet at all times during the subsequent processing, staining, and mounting steps. If the tissue is allowed to dry out, then loss of antigenicity and degradation of cellular morphology will occur and the tissue section cannot be optimally stained. Although the slides can be temporarily kept in a wet state for short periods of time, any prolonged storage of over a few hours will result in antigen degradation resulting in weak IHC staining.

Until now there have been no methods described to allow the deparaffinized samples on slides to be stored for days or months. Furthermore, there have been no methods described to allow samples on slides that have been rehydrated or even post-antigen retrieval to be stored for days or months. Such a method of slide storage would be advantageous because the investigators desiring to perform IHC staining on a group of slides has more flexibility in optimizing their workflow. For example, an investigator may wish to perform all of the preliminary steps including deparaffinization and antigen retrieval on a batch of slides, but perform the staining steps on individual slides where each slide is stained with a different antibody. The selection of the specific antibodies for staining may be determined from the information derived from the preceding antibody stain, so that it would be useful to have a method of storing the individual slides, without antigen degradation, until the antibodies desired to be used are determined.

Therefore, a need exists for novel methods of protecting antigens in tissue sections prior to immunohistochemical staining and other analysis procedures.

BRIEF SUMMARY OF THE INVENTION

An antigen protection method for enabling delayed processing is provided which is able to protect the antigens in a biological sample on a microscope slide from becoming degraded during storage. The only other method to achieve this goal is to leave the tissue embedded in the paraffin. Once the paraffin has been removed the deparaffinized tissue samples must be kept wet to prevent loss of antigenicity. However, storage of wet tissues for any significant length of time, beyond a few hours, will result in loss of antigenicity. The present invention allows the deparaffinized slides to be stored in a dried state for significant periods of time without loss of antigenicity. The method may include protecting the antigens in a biological sample on a microscope slide after de-embedding, such as deparaffinization, such that the biological sample on a microscope slide can be stored for long periods of time without loss of antigenicity. Additionally, the method allows all of the common steps, such as deparaffinization and antigen retrieval to be performed on a batch of slides, even if the individual antibodies and IHC stains are not known. Because the steps of deparaffinization and antigen retrieval can now be separated from the staining steps, the staining steps can be determined at a later time point.

In some embodiments, the antigen protection method for enabling delayed sample processing may include: fixing a sample; embedding the sample; sectioning the sample and placing a section of the sample in contact with a microscope slide to produce a sectioned sample; de-embedding the sectioned sample; applying a protecting reagent onto the sectioned sample; drying the protecting reagent; and performing target retrieval on the sectioned sample, in which a period of time is allowed to elapse between the completion of the step of drying the protecting reagent and the beginning of the step of performing target retrieval on the sectioned sample In some embodiments, the antigen protection method for enabling delayed sample processing may include: fixing a sample; embedding the sample; sectioning the sample and placing a section of the sample in contact with a microscope slide to produce a sectioned sample; de-embedding the sectioned sample; rehydrating the sectioned sample; applying a protecting reagent onto the sectioned sample; drying the protecting reagent; and performing target retrieval on the sectioned sample, in which a period of time is allowed to elapse between the completion of the step of drying the protecting reagent and the step of performing target retrieval on the sectioned sample.

In some embodiments, the antigen protection method for enabling delayed sample processing may include: fixing a sample; embedding the sample; sectioning the sample and placing a section of the sample in contact with a microscope slide to produce a sectioned sample; de-embedding the sectioned sample; performing target retrieval on the sectioned sample; applying a protecting reagent onto the sectioned sample; drying the protecting reagent; and performing target visualization on the sectioned sample, in which a period of time is allowed to elapse between the completion of the step of drying the protecting reagent and the beginning of the step of performing target visualization on the sectioned sample.

It is an object of the present invention to provide an antigen protection method for use in paraffin-embedded tissue sections for protecting antigens in tissue sections prior to immunohistochemical staining.

Another object is to provide an Antigen Protection method for use in Paraffin-embedded Tissue Sections that can be applied to the tissue after deparaffinization.

Another object is to provide an Antigen Protection method for use In Paraffin-embedded Tissue Sections that can be applied after heat-induced antigen retrieval and prior to immunohistochemical staining or In Situ Hybridization staining.

Another object is to provide an Antigen Protection for use In Paraffin-embedded Tissue Sections that allows tissue sections that have been deparaffinized and have been subjected to heat-induced target retrieval to be stored for extended periods of time without loss of tissue and cellular morphology.

Another object is to provide an Antigen Protection method for use In Paraffin-embedded tissue sections that allows tissue sections that have been deparaffinized and subjected to heat-induced antigen retrieval to be stored for an extended period of time without loss of antigenicity.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
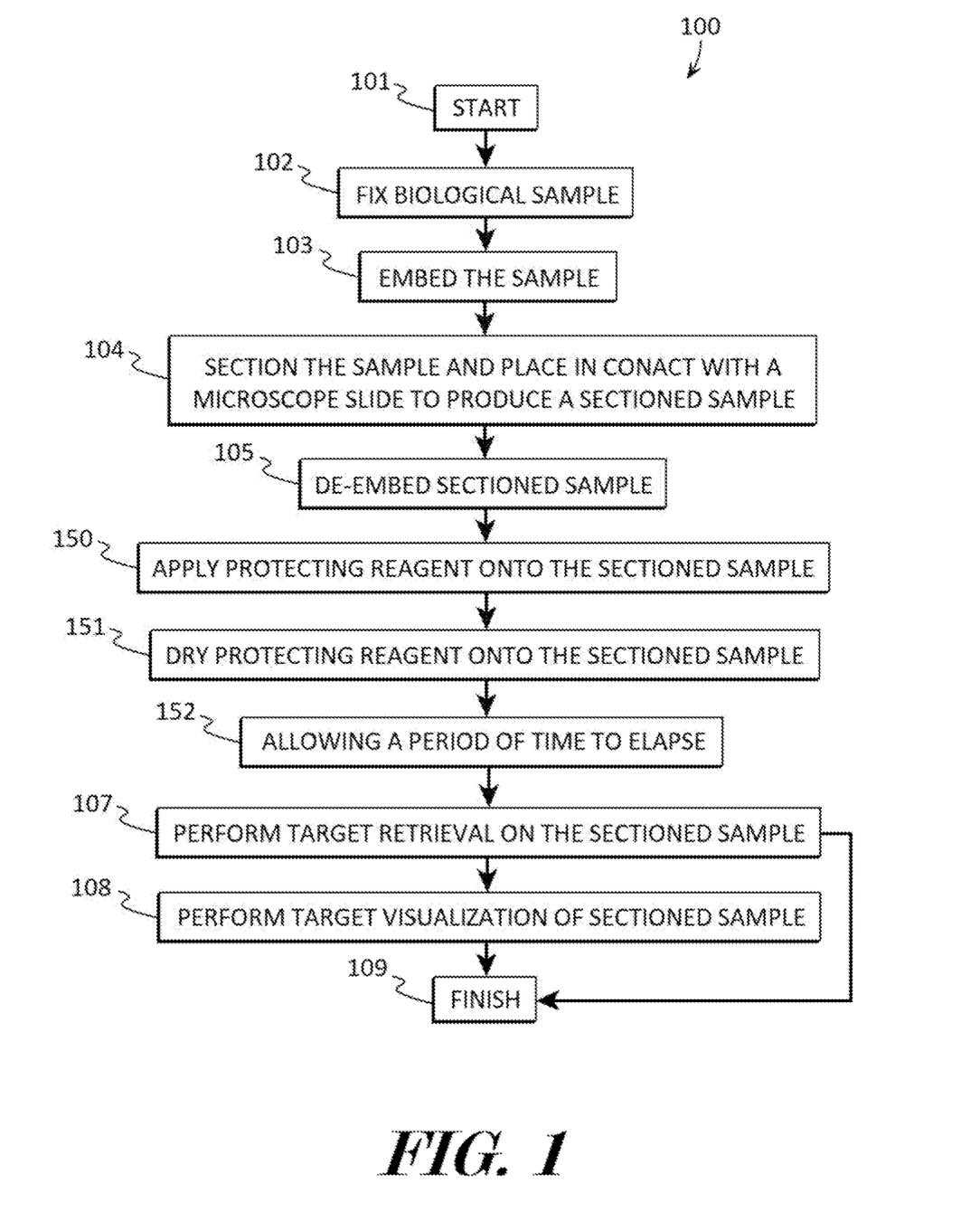
FIG. 1 depicts a block diagram of an example of an antigen protection method for enabling delayed processing according to various embodiments according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new method for protecting the antigens in a biological sample on a microscope slide, such that the microscope slide can be stored for long periods of time without loss of antigenicity, is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 2:
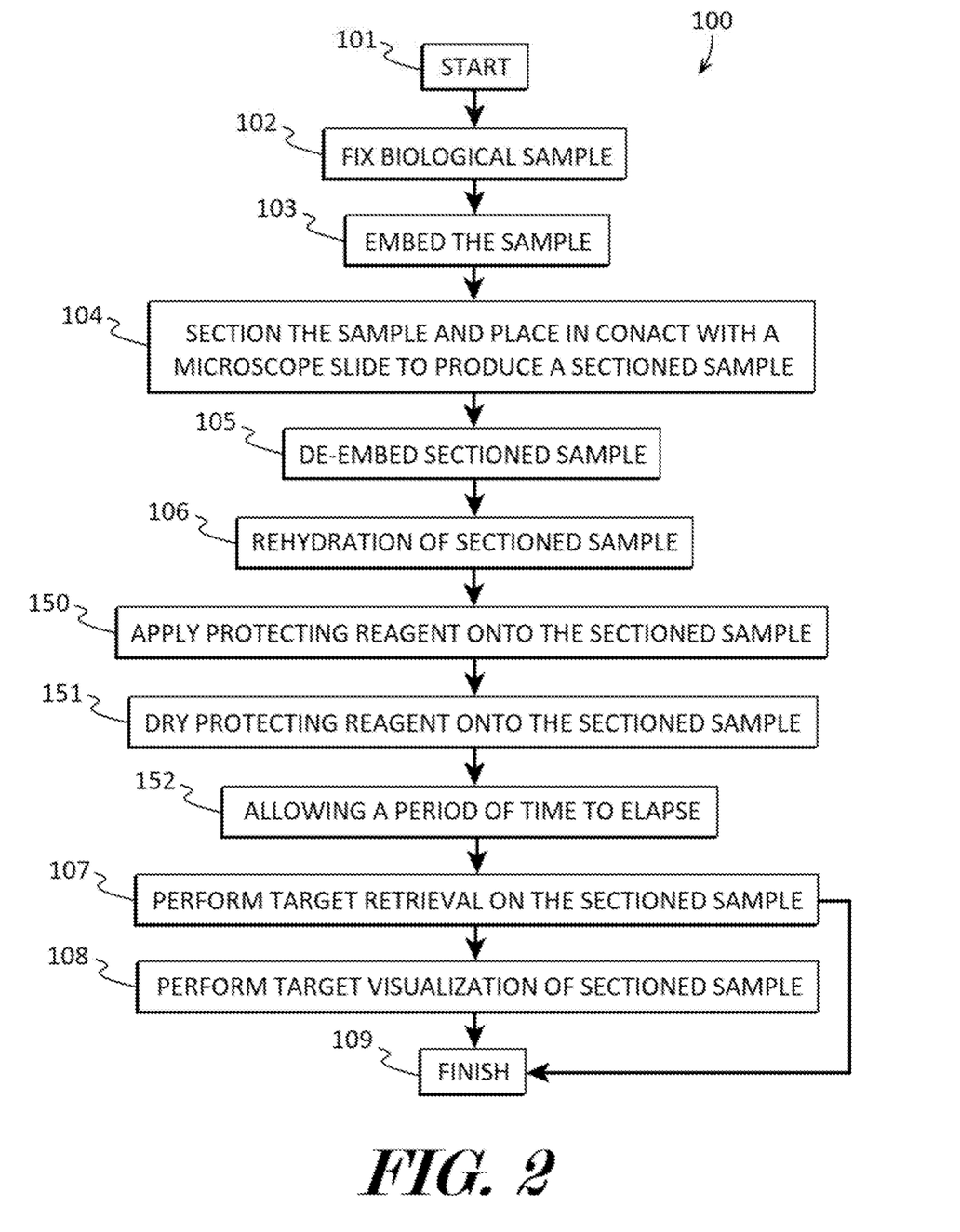
FIG. 2 illustrates a block diagram of another example of an antigen protection method for enabling delayed processing according to various embodiments according to various embodiments described herein.
Figure 3:
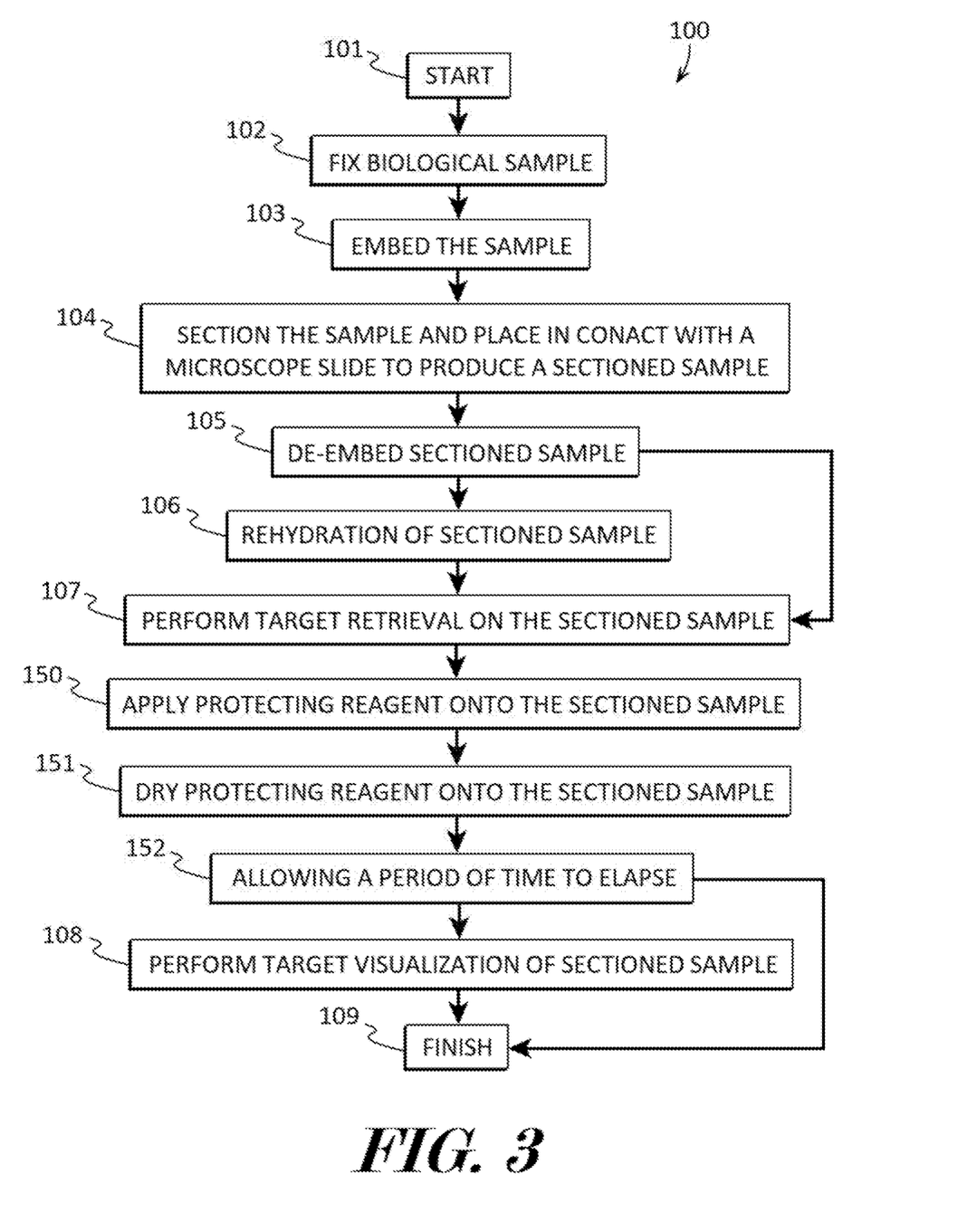
FIG. 3 shows a block diagram of a further example of an antigen protection method for enabling delayed processing according to various embodiments according to various embodiments described herein.

The present invention will now be described by example and through referencing the appended figures representing preferred and alternative embodiments. FIGS. 1-3 illustrate examples of an antigen protection method for enabling delayed processing ("the method") 100 according to various embodiments. The method 100 may be used for protecting the antigens in a biological sample on a microscope slide, such that the microscope slide can be stored for long periods of time without loss of antigenicity.

One of the limitations of staining paraffin embedded tissue sections, and particularly staining by immunohistochemistry, is that the sequence of processing steps after deparaffinization must proceed without interruption from beginning to end. After deparaffinization the tissues must be kept in a suitable buffer and prevented from drying out. Typically, the entire staining process will take a few hours to complete. During this time it is possible to interrupt the staining process for a few minutes or hours if the tissues are kept in a buffer solution to prevent drying. However, heretofore it has not been possible to store the slides for any significant length of time after deparaffinization.

In certain circumstances it would be advantageous to separate the steps of deparaffinization and antigen retrieval from the staining steps. This would allow better control of workflow by separating the steps of deparaffinization and antigen retrieval from the steps of staining and mounting.

A significant limitation of the staining process, and particularly IHC staining, is that all steps of the staining process must be completed promptly without interruption. In certain circumstances the staining process may be temporarily suspended for a few minutes or hours if the deparaffinized tissue sections are kept in a buffer solution and not allowed to dry out. However, it is not possible to store the deparaffinized slides for days or months without degradation of cellular morphology and loss of antigenicity.

The antigen protection enabling delayed processing method 100 of the present invention includes steps 150-151 which provide a protection layer on top of the deparaffinized tissue. The protection layer, preferably comprising an aqueous solution of a water-soluble polymer and/or a water-soluble wax, is then allowed to dry over the tissue sample. Once dried, the slides can then be stored for days or months, or longer without any loss of antigenicity. The steps of staining may then be completed at a later date.

The protection layer is formed from a protecting reagent that is allowed to dry over a sectioned tissue sample, such as after de-embedding (step 105), rehydrating (step 106), and/or target retrieval (step 107). In some embodiments, the protecting reagent may be or may comprise a water-soluble polymer, and preferably an aqueous solution comprising a water-soluble polymer, from the family of glycols, such as polypropylene glycol. In some embodiments, the protecting reagent may be or may comprise a water-soluble wax, and preferably an aqueous solution comprising a water-soluble wax, such as polyethylene glycol and methoxypolyethylene glycol. In some embodiments, the protecting reagent may be or may comprise a polysaccharide, and preferably an aqueous solution comprising a water-soluble polysaccharide, from the family of polysaccharides derived from algae such as Alginic Acid, or polysaccharides derived from seaweeds such as Carrageenan. In some embodiments, the protecting reagent may be or may comprise a polyvinyl, and preferably an aqueous solution comprising a water-soluble polyvinyl, from the family of polyvinyls such as polyvinyl alcohol or polyvinyl pyrrolidone. In further embodiments, a protecting reagent may be or may comprise any water-soluble polymer, water-soluble wax, water-soluble polyvinyl, and/or water-soluble polysaccharide.

The protecting reagent thus formed may be applied to the deparaffinized tissue sample while the tissue sample is still wet from buffer solution. The protecting reagent may be applied immediately after deparaffinization and buffer rinse (step 105), after rehydration (step 106), and/or after target retrieval (step 107). The protecting reagent may be applied in a liquid form over the tissue of the sectioned sample and allowed to dry to form a protection layer. The slides are now ready for storage. At the time when staining procedure is to resume the slides containing the sectioned samples with the protection layer are simply placed into water or aqueous buffer solution, and the protection layer is then dissolved thus exposing the tissue in preparation for staining.

The steps of staining may now commence beginning at the next step that would have otherwise commenced if the protection reagent had not been applied. For example, in the case where the protection reagent was applied after deparaffinization and buffer rinse, the slides with the protection layer would be placed back into the buffer rinse to dissolve the protection layer and then proceed into antigen retrieval. As another example, if the protection reagent had been applied to the slide after antigen retrieval, then the slide with the protection layer would be placed into buffer solution to remove the protection layer and then the steps of IHC staining would commence.

Biological samples of cells and/or tissues are obtained for purposes of analyzing the biological constituents that comprise the sample. Sample analysis may be performed by methods of immunohistochemistry for analyzing protein components, or in situ hybridization for analyzing nucleic acid components. Prior to the analysis the sample must be prepared by appropriate methods. For example, a tissue biopsy may be removed from a patient and used as a biological sample for analysis.

The method 100 may start 101, and in some embodiments, the method 100 may comprise fixing the biological sample in step 102. Generally, biological samples containing cells or tissues are fixed to render them metabolically inactive and preserve molecular structures. In some embodiments, the method 100 may utilize a fixative comprising formalin in aqueous solutions in order to fix the sample. In addition to formalin there are several fixative methods that can be used, such as alcohols, (methanol and ethanol), acetone, glutaraldehye, and combinations thereof. Any suitable fixing method or composition may be used in step 102. Depending on the sectioning media and sectioning technique used in steps 103 to 105, step 102 may be performed before step 103, such as with paraffin sectioning media and resin sectioning media, or after step 105, such as with frozen aqueous solution sectioning media.

In step 103, the sample may be embedded in a sectioning media so that the sectioning media may provide a firm surrounding matrix of the sample to support the sample during sectioning. Any suitable sectioning media or composition may be used in step 105. In some embodiments, the sample may be embedded in solid paraffin to provide a firm surrounding matrix for the sample. In further embodiments, the sample may be embedded in a resin, such as epoxy and acrylic resins.

In some embodiments, step 103 may optionally comprise infusing the sample with embedding solvent. In further embodiments, after the sample has been fixed, the sample may be dehydrated in step 103. Any suitable dehydrating method or composition may be used in step 103. For example, the sample may be dehydrated through a series of graded alcohols to remove all water. After the sample has been dehydrated, the sample may be infused with embedding solvent in step 103. Any suitable embedding solvent infusing method or composition may be used. For example, the sample may be placed into a series of baths containing a paraffin solvent such as xylene (xylene being a solvent of the embedding media paraffin). The baths contain decreasing concentrations of alcohol and increasing concentrations of xylene. When the tissue is put through the final bath, the alcohol has been completely replaced with xylene.

In step 103, the sample may be embedded a sectioning media so that the sectioning media may provide a firm surrounding matrix of the sample to support the sample during sectioning. Any suitable sectioning media or composition may be used. In some embodiments, the sample may be embedded in solid paraffin to provide a firm surrounding matrix for the sample. Once the sample is infiltrated with xylene it can be embedded into a sectioning media of paraffin by placing the sample into heated paraffin that has been melted. The melted paraffin can now infiltrate the sample replacing the xylene. When cooled the paraffin solidifies to form a solid paraffin block containing the sample. In other embodiments of step 103, a sample may be placed in water or aqueous solution and then frozen into a solid block of ice. This renders the sample sufficiently rigid that it can be sectioned into thin slices using a cryostat instrument. Samples prepared in this manner avoid the paraffin-embedding process.

In step 104, the embedded sample may be sectioned via any suitable sectioning method or device and applied to a microscope slide to form a sectioned sample. For example, a microtome may be used to cut thin sections from the sample, embedded in a sectioning media such as paraffin, at approximately 4 to 6 microns thickness to produce one or more sectioned samples each having approximately 4 to 6 microns thickness. As another example, a sample placed in water or aqueous solution and then frozen into a solid block of ice may be sectioned into thin slices using a cryostat instrument. The thin sections containing the sectioned samples and the sectioning media or matrix are then applied to a microscope slide, and the thin sectioned sample becomes adherent to the microscope slide due to electrostatic interactions between the sample and the microscope slide.

In step 105, the sectioned sample may be de-embedded from the sectioning media. For samples that were embedded in a sectioning media of paraffin, step 105 includes the removal of the paraffin (deparaffinization) as the presence of paraffin inhibits the staining process.

In some embodiments, paraffin can be removed by heating the biological sample to melt the paraffin in aqueous buffer then no additional rehydration (step 106) is required, and the method 100 may proceed from step 105 to step 107 (FIGS. 1 and 3). The paraffin can be removed or de-embedded in step 105 by heating the sample in an aqueous buffer. If the heating temperature is above the melting point of the paraffin (generally about 60 degrees Celsius), the paraffin will melt and be released into the heating fluid. The melted paraffin can then be removed by discarding the aqueous solution leaving behind the deparaffinized sample.

In some embodiments, paraffin can be removed or de-embedded in step 105 by treating the biological sample with a paraffin solvent, such as xylene, to dissolve the paraffin. If the sample is deparaffinized in xylene, then it must be rehydrated first with alcohol and then buffer, and the method 100 may proceed from step 105 to step 106 (FIGS. 2 and 3). This more common method of deparaffinization involves submerging the microscope slide with the attached sample into a paraffin solvent, such as xylene. In this case the paraffin is dissolved into the paraffin solvent without the requirement for using an elevated temperature. This method avoids the use of elevated temperatures and is the method most commonly used. The melted or dissolved paraffin can then be removed by discarding the deparaffinizing solution leaving behind the deparaffinized sample. Following deparaffinization the sample is rehydrated into water or a suitable aqueous buffer.

Paraffin may be removed by many paraffin solvents. These solvents are generally categorized as apolar solvents and include xylenes, toluenes, naphthalenes and other related aromatic hydrocarbons, and citrus oils such as d-limonenes.

Methods of removing the paraffin by melting include a variety of mostly aqueous buffers and reagents. These methods have in common that they remove the paraffin by elevating the temperature of the reagent above the melting point of the paraffin. In some embodiments, heating methods of deparaffinization or de-embedding of step 105 may be combined with the subsequent step 107 of heat induced antigen retrieval (target retrieval) such that these two steps are combined into a single step. It should be understood that any method of deparaffinization may be used in step 105.

For embedding methods that do not include paraffin, such as embedding methods that comprise freezing the tissue sample into a solid block of ice, the sectioned sample may be warmed to allow the ice sectioning media to melt to de-embed the section sample in step 105. It should be understood that any method of de-embedding the sample from a sectioning media may be used in step 105.

In some embodiments, and as shown in FIG. 1, after step 105, the method 100 may proceed to steps 150-152. For example, if the sample is de-embedded via being deparaffinized by melting in aqueous buffer then a rehydration (step 106) is not required and the method may proceed from step 105 to step 150. In further embodiments of the method 100, and as shown in FIG. 2, after step 105 the method 100 may proceed to optional step 106. In still further embodiments of the method 100, and as shown in FIG. 3, after step 105 the method 100 may proceed to optional step 106 or to step 107.

The method 100 includes steps 150-152 which enable delayed processing of the sample for a period of time by protecting the antigens in the biological sample on a microscope slide from becoming degraded during the time period. In some embodiments, steps 150-152 may be performed between steps 105 and 107 as shown in FIG. 1. In further embodiments, steps 150-152 may be performed between steps 106 and 107 as shown in FIG. 2. In still further embodiments, steps 150-152 may be performed between steps 107 and 108 as shown in FIG. 3. It should be understood that steps 150-152 of the method 100 may be performed after de-embedding (step 105), after rehydrating (step 106), and/or after target retrieval (step 107).

In step 150, a protecting reagent may be applied onto the sectioned sample so that all or portions of the sectioned sample and portions of the microscope slide that the sample is positioned on are covered by the protecting reagent. In some embodiments, a protecting reagent may comprise a water-soluble wax, such as polyethylene glycol. Once the polyethylene glycol has dried over the sample it provides a waxy protective coating that protects the sample from detachment during heat-induced antigen retrieval. Because the waxy coating is water soluble, it is slowly solubilized and removed during the antigen-retrieval step, such that the wax has been entirely removed by the end of the antigen-retrieval procedure. In some embodiments, the protecting reagent may be or may comprise a polysaccharide, and preferably an aqueous solution comprising a water-soluble polysaccharide, from the family of polysaccharides derived from algae such as Alginic Acid, or polysaccharides derived from seaweeds such as Carrageenan. In some embodiments, the protecting reagent may be or may comprise a polyvinyl, and preferably an aqueous solution comprising a water-soluble polyvinyl, from the family of polyvinyls such as polyvinyl alcohol or polyvinyl pyrrolidone. In further embodiments, a protecting reagent may be or may comprise any water-soluble polymer, water-soluble wax, and/or water-soluble polysaccharide that can be subsequently removed with water and does not interfere with staining may be used in step 109. In further embodiments, a protecting reagent may comprise a solution of between approximately 1.0 to 99.99 percent, and more preferably between approximately 1.0 to 10.0 percent, water-soluble wax dissolved in water. In still further embodiments, a protecting reagent may comprise a solution of between approximately 1.0 to 99.99 percent, and more preferably between approximately 1.0 to 10.0 percent, water-soluble polymer dissolved in water. In still further embodiments, a protecting reagent may comprise a solution of between approximately 1.0 to 99.99 percent, and more preferably between approximately 1.0 to 10.0 percent, water-soluble polysaccharide dissolved in water. In still further embodiments, a protecting reagent may comprise a solution of between approximately 1.0 to 99.99 percent, and more preferably between approximately 1.0 to 10.0 percent, water-soluble polyvinyl dissolved in water.

In step 151, the protecting agent may be dried. Once the protecting agent has dried over the sample and portions of the microscope slide it provides a waxy protective coating that protects the sample from detachment from the microscope slide during target retrieval. Any suitable drying method may be used, including heat and/or time. For example, the slides having a sectioned sample and protecting agent may be dried for 2 hours at 37 C until all of the protecting reagent had dried, thus leaving a protective layer on top of the sample.

In step 152, a period of time may be allowed to elapse between the completion of step 151 and the beginning of the performance of the next step of the method 100. In preferred embodiments, the period of time may be greater than approximately 6 hours. In other embodiments, the period of time may be greater than 2 hours. Previously, it has been possible to separate de-embedding, such as deparaffination, and rehydration steps for a few minutes or hours and only if the sample containing slides are kept in a buffer solution to prevent drying. If the tissue is allowed to dry out, then loss of antigenicity and degradation of cellular morphology will occur and the tissue section cannot be optimally stained. Although the sample containing slides can be temporarily kept in a wet state for short periods of time, any prolonged storage of over a few hours will result in antigen degradation resulting in weak IHC staining. However, with the method 100 of the present invention, and in the embodiment of the method 100 shown in FIG. 1, it is now possible to separate de-embedding and rehydration steps without incurring antigen degradation for a period of time that is greater than approximately 6 hours and without the requirement that the sample containing slides must be kept in a buffer solution to prevent drying.

In some embodiments of the method 100, and as shown in FIG. 2, after step 106 the method 100 may proceed to steps 150-152. Previously, it has been possible to separate rehydration and target retrieval steps for a few minutes or hours and only if the sample containing slides are kept in a buffer solution to prevent drying. If the tissue is allowed to dry out, then loss of antigenicity and degradation of cellular morphology will occur and the tissue section cannot be optimally stained. Any drying of the tissue of the sectioned sample has deleterious effects including loss of antigenicity, increased nonspecific staining, and degradation of morphology, so that the tissue of the sectioned sample cannot be optimally stained. For these reasons the staining process must proceed from start to finish in order to achieve optimal staining. Although the sample containing slides can be temporarily kept in a wet state for short periods of time, any prolonged storage of over a few hours will result in antigen degradation resulting in weak IHC staining. However, with the method 100 of the present invention, and in the embodiment of the method 100 shown in FIG. 2, it is now possible to separate rehydration and target retrieval steps without incurring antigen degradation for a period of time that is greater than approximately 2 hours, and more preferably greater than approximately 6 hours, and without the requirement that the sample containing slides must be kept in a buffer solution to prevent drying. In some embodiments of the method 100, and as depicted in FIG. 2, after step 152 the method may proceed to step 107. In further embodiments and as shown in FIGS. 1 and 3, after step 106 the method 100 may proceed to step 107.

In step 107, target retrieval may be performed on the sectioned sample. The biological samples thus prepared generally cannot be stained until the targets have been retrieved. For purposes of this specification, unless otherwise noted, the terms antigen-retrieval, epitope-retrieval, and target-retrieval are interchangeable, and will be referred to collectively as antigen retrieval.

In some embodiments, target retrieval may comprise heat-induced antigen retrieval. During the preceding fixation process, and in particular fixation with formalin, the proteins and nucleic acids become denatured and cross-linked, such that the targets are hidden from subsequent binding by an appropriate probe or antibody. The biological samples must then be treated with heat during a process call Heat-Induced Target Retrieval if they are to be subsequently stained by Immunohistochemistry or In Situ Hybridization. In the case of Immunohistochemistry, the more specific term of Heat-Induced Antigen Retrieval is frequently used.

Antigen retrieval is a process of treating a biological sample to retrieve antigens prior to staining, such that they become detectable by IHC staining. In IHC staining, a first antibody is applied to a sample and binds to the molecule of interest if present. If the molecule of interest is not present no binding occurs. It is this binding event that determines the presence of absence of the molecule of interest. The molecule of interest is termed an antigen. During the process of preparing a sample for IHC staining, the sample may be subjected to a fixative solution. The fixative solution halts all metabolic activity in the sample and immobilizes the molecular structure by creating chemical links within the molecular structure. Such links help maintain the molecular structure during staining and analysis. However, such cross-links may also alter the molecular structure in such a way that antibodies can no longer bind to their antigen. In this case the antigen is referred to as denatured. Denatured antigens cannot be stained by IHC, and they must first be retrieved and restored to their native configuration. The process of antigen retrieval is intended to retrieve antigens such that they become detectable by IHC staining.

There are generally two preferred method for target retrieval or antigen retrieval. The first method is termed Enzyme Antigen Retrieval. In this method a proteolytic enzyme is applied to the biological sample and is allowed to moderately digest the protein structures such that the molecular cross-links are broken and the antigens are restored to a more natural configuration. The method of Enzyme Antigen Retrieval is poorly understood and it is not clear why this method works for some antigens but not for others. Some examples of proteolytic enzymes that have been shown to work for Enzyme Antigen Retrieval include pepsin, papain, trypsin, Proteinase K, Protease Type XXIV, and chymotrypsin.

The second form of Antigen Retrieval is Heat-Induced Antigen Retrieval. In this method the biological samples are heated to a temperature of about 90-125 degrees Celsius, in an aqueous Antigen Retrieval solution. Typical antigen retrieval solutions include 0.05M Tris plus 0.001M EDTA in water at a pH of 9.0, or 0.1M Citric acid solution, pH 6. Other variations of these basic formulations are common. The antigen retrieval solution with the microscope slides is heated to an elevated temperature of approximately 90 to 125 degrees Celsius for a sufficient length of time to expose the hidden antigens. The slides are then placed into a buffer bath to cool. The heating of the sample results in the breaking of the cross-links, thus restoring the antigens to a more natural configuration. First the slides are deparaffinized and rehydrated as described above. Next the samples are submerged into an Antigen Retrieval solution.

Enzyme Antigen Retrieval with proteolytic enzymes is rarely performed anymore because it has been shown that Heat Antigen Retrieval is generally superior. When performed the samples are submerged in enzyme solution at a temperature of about 20 to 37 degrees Celsius, and allowed to incubate in this solution for approximately 5 to 10 minutes. The samples are then rinsed in buffer to complete the Enzyme Antigen Retrieval step.

Occasionally the target retrieval is performed sequentially by using both Enzyme Antigen Retrieval and Heat Antigen Retrieval sequentially. This sequential approach seems to synergistically benefit from both methods, such that frequently antigens are retrieved more completely than either method alone.

In some embodiments, and as shown in FIGS. 1 and 2, after step 107, the method 100 may proceed to optional step 108. In further embodiments, and as shown in FIGS. 1 and 2, after step 107, the method 100 may optionally finish 109.

In some embodiments of the method 100, and as shown in FIG. 3, after step 107 the method 100 may proceed to steps 150-152. Previously, it has been possible to separate target retrieval and target visualization steps for a few minutes or hours and only if the sample containing slides are kept in a buffer solution to prevent drying. If the tissue is allowed to dry out, then loss of antigenicity and degradation of cellular morphology will occur and the tissue section cannot be optimally stained. Any drying of the tissue of the sectioned sample has deleterious effects including loss of antigenicity, increased nonspecific staining, and degradation of morphology, so that the tissue of the sectioned sample cannot be optimally stained. For these reasons the staining process must proceed from start to finish in order to achieve optimal staining. Although the sample containing slides can be temporarily kept in a wet state for short periods of time, any prolonged storage of over a few hours will result in antigen degradation resulting in weak IHC staining. However, with the method 100 of the present invention, and in the embodiment of the method 100 shown in FIG. 3, it is now possible to separate target retrieval and target visualization steps without incurring antigen degradation for a period of time that is greater than approximately 6 hours and without the requirement that the sample containing slides must be kept in a buffer solution to prevent drying. In some embodiments of the method 100, and as depicted in FIG. 3, after step 152 the method may proceed to step 108.

In step 108, target visualization may be performed on the sectioned samples. Target visualization may comprise any method for visually detecting one or more targets or components of the tissue of a sectioned sample. In preferred embodiments, the targets may be visually detected and studied by applying various staining methods to the samples that render the targets visible by microscopic analysis. Some methods of staining targets include immunohistochemistry (IHC), Immunocytochemicstry (ICC), and In Situ Hybridization (ISH). IHC is used to study tissues whereas ICC is used to study collections of individual cells. Both of these methods are similar with the main difference being the source of the biological sample. For simplicity this invention will refer to both methods simply as IHC. However, it should be understood that this invention applies equally to all biological samples regardless of whether they are tissue-based or cellular in origin.

In the immunohistochemistry staining method, a first antibody is applied to a sample and binds to the antigen, also known as an antigen, if present. If the antigen is not present no binding occurs. It is this binding event that determines the presence of absence of the antigen. During the process of preparing a sample for IHC staining, the sample may be subjected to a fixative solution. The fixative solution halts all metabolic activity in the sample and immobilizes the molecular structure by creating chemical links within the molecular structure. Such links help maintain the molecular structure during staining and analysis. However, such cross-links may also alter the molecular structure in such a way that antibodies can no longer bind to their antigen. In this case the antigen is referred to as denatured. Denatured antigens cannot be stained by IHC, and they must first be retrieved and restored to their native configuration. The process of antigen retrieval is intended to retrieve antigens such that they become detectable by IHC staining.

After step 108, the method 100 may finish 109.

EXAMPLES OF EMBODIMENTS OF THE PRESENT INVENTION

Example 1. Protection Reagent

A protection reagent was prepared by dissolving polyethylene glycol (PEG), molecular weight 3350D, in water at a concentration of 5% (w/v). After antigen retrieval and cooling the slides were placed horizontally with the tissue side up. While still wet the tissues were overlayed with 200 ul of the PEG solution and allowed to dry at room temperature. The dried slides were then stored for various lengths of time at either 22 C (normal storage temperature) or 37 C (elevated storage temperature). After storage for different periods of time the slides were stained by immunohistochemistry.

Example 2. Immunohistochemistry Procedure

Slides were stained by immunohistochemistry using antibodies for Cytokeratiin AE1/AE3 and CD20 (Diagnostic BioSystems) and detected with a peroxidase staining method (diagnostic BioSystems) according to the manufacturer's instructions.

Slides were then counterstained with hematoxylin and mounted with a permanent mounting medium and coverslip prior to microscopic examination.

Immunohistochemistry staining results graded on a scale of 0-3 with 0=no staining, 1=weak staining, 2=moderate staining, and 3=strong staining.

Example 3. Staining Results for Immunohistochemistry

The following Tables display the results for Immunohistochemistry staining either without a protection layer or with a protection layer applied after deparaffinization or after antigen retrieval. These results show that the protection layer protected the tissues from antigen degradation resulting in stronger IHC staining.

TABLE 1

Description of Various Treatments

| Treatment | Description |
| --- | --- |
| 1 | Deparaffinization |
| 2 | Protection Layer |
| 3 | Antigen Retrieval |
| 4 | Protection Layer |
| 5 | IHC Staining |

TABLE 2

Description of Various Groups and Their Treatments

| Groups | Treatment Prior to Storage | Storage for 6 Weeks | Treatment at Time of Staining | Description |
| --- | --- | --- | --- | --- |
| 1 | None | No | 1, 3, 5 | Control Group using standard treatment |
| 2 | 1, 2 | Yes | 3, 5 | Protection layer after deparaffinization and before antigen retrieval |
| 3 | 1, 3, 4 | Yes | 5 | Protection layer after deparaffinization and after antigen retrieval |
| 4 | 1 | Yes | 3, 5 | Deparaffinization, but no protection layer |
| 5 | 1, 3 | Yes | 5 | Deparaffinization and antigen retrieval, but no protection layer |

TABLE 3

Immunohistochemistry with Protection Layer Results.
Slides were stored for 6 weeks at Room Temperature

| Group | Antibody | Results | Description |
| --- | --- | --- | --- |
| 1 | AE1/AE3 | 3 | Control group with strong staining |
|   | CD20 | 3 | Control group with strong staining |
| 2 | AE1/AE3 | 3 | Strong staining with protection layer |
|   | CD20 | 3 | Strong staining with protection layer |
| 3 | AE1/AE3 | 3 | Strong staining with protection layer |
|   | CD20 | 3 | Strong staining with protection layer |
| 4 | AE1/AE3 | 1 | Weak staining without protection layer |
|   | CD20 | 1 | Weak staining without protection layer |
| 5 | AE1/AE3 | 0 | No staining without protection layer |
|   | CD20 | 0 | No staining without protection layer |

TABLE 4

Immunohistochemistry with Protection Layer Results
Slides were stored for 6 weeks at 37 C.

| Group | Antibody | Results | Description |
| --- | --- | --- | --- |
| 1 | AE1/AE3 | 3 | Control group with strong staining |
|   | CD20 | 3 | Control group with strong staining |
| 2 | AE1/AE3 | 3 | Strong staining with protection layer |
|   | CD20 | 3 | Strong staining with protection layer |
| 3 | AE1/AE3 | 3 | Strong staining with protection layer |
|   | CD20 | 3 | Strong staining with protection layer |
| 4 | AE1/AE3 | 0 | Weak staining without protection layer |
|   | CD20 | 0 | Weak staining without protection layer |
| 5 | AE1/AE3 | 0 | No staining without protection layer |
|   | CD20 | 0 | No staining without protection layer |

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An antigen protection method for enabling delayed sample processing, the method comprising the steps performed in the following sequential order of:
    fixing a sample;
    embedding the sample, wherein the sample is not fixed again after the step of embedding;
    sectioning the sample and placing a section of the sample in contact with a microscope slide to produce a sectioned sample;
    de-embedding the sectioned sample;
    performing target retrieval on the sectioned sample;
    applying a protecting reagent onto the sectioned sample;
    drying the protecting reagent; and
    performing target visualization on the sectioned sample, wherein a period of time is allowed to elapse between the completion of the step of drying the protecting reagent and the beginning of the step of performing target visualization on the sectioned sample.

2. The method of claim 1, wherein the target visualization comprises one selected from the group consisting of immunohistochemistry (IHC), In Situ Hybridization (ISH), and Immunocytochemistry (ICC).

3. The method of claim 1, wherein the period of time is greater than 6 hours.

4. The method of claim 1, wherein the protecting reagent comprises a material selected from the group consisting of: a water-soluble polymer, a water-soluble wax, water-soluble polyvinyl, and a water-soluble polysaccharide.

5. The method of claim 1, wherein the protecting reagent is selected from the group consisting of: polyethylene glycol, polypropylene glycol, methoxypolyethylene glycol, polyvinyl alcohol, polyvinyl pyrrolidone, alginic acid, and carrageenan.

6. The method of claim 1, wherein the target retrieval comprises heat-induced antigen retrieval.

7. The method of claim 1, wherein the target retrieval comprises enzyme antigen retrieval.

* * * * *